United States Patent
Fraese et al.

(10) Patent No.: US 10,556,278 B2
(45) Date of Patent: Feb. 11, 2020

(54) TOOL BODY FOR A SHELL END MILL AND CUTTING TOOL

(71) Applicant: Kennametal Inc., Latrobe, PA (US)

(72) Inventors: Alex Fraese, Hagenbuechach (DE); Mark Alan Francis, Solon, OH (US); Werner Bruno Penkert, Schwanstetten (DE); Michael Kreuzer, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 112 days.

(21) Appl. No.: 15/238,214

(22) Filed: Aug. 16, 2016

(65) Prior Publication Data
US 2018/0050397 A1    Feb. 22, 2018

(51) Int. Cl.
*B23C 5/28* (2006.01)
*B23C 5/20* (2006.01)
*B23C 5/22* (2006.01)

(52) U.S. Cl.
CPC .............. *B23C 5/2208* (2013.01); *B23C 5/28* (2013.01); *B23C 2210/168* (2013.01); *B23C 2250/12* (2013.01)

(58) Field of Classification Search
CPC ... B23C 2210/168; B23C 5/06; B23C 5/2208; B23C 2200/086; B23C 2210/40; B23C 2250/12; B23C 5/109; B23C 5/28; B23P 15/34
See application file for complete search history.

(56) References Cited

U.S. PATENT DOCUMENTS

| | | | |
|---|---|---|---|
| 3,018,675 A | 1/1962 | Klages | |
| 4,078,868 A * | 3/1978 | Erkfritz | B23C 5/2208 407/104 |
| 4,341,493 A * | 7/1982 | Erkfritz | B23C 5/20 407/36 |
| 4,606,680 A | 8/1986 | Striegl | |

(Continued)

FOREIGN PATENT DOCUMENTS

| | | |
|---|---|---|
| CN | 101827676 A | 9/2010 |
| CN | 101674911 B | 9/2011 |

(Continued)

OTHER PUBLICATIONS

Aug. 9, 2017 International Search Report.

(Continued)

*Primary Examiner* — Sara Addisu
(74) *Attorney, Agent, or Firm* — Matthew S. Bedsole (57) ABSTRACT

A tool body (12) for a shell end mill (10) is described with at least one helical chip guiding groove (24) arranged at the circumference of the tool body (12) for chip dissipation and at least two receptacles (28) for indexable cutting inserts (26) arranged at the chip guiding groove (24). In this case, the receptacles (28) each include a base surface having a bore for receiving an indexable cutting insert fastening screw (34) and at least one first abutment surface adjacent to the base surface. The transition between the base surface and the first contact surface is a groove. In addition, a cutting tool is described with such a tool body, wherein a two-sided indexable cutting insert (26) is attached in each receptacle (28).

14 Claims, 8 Drawing Sheets

(56) References Cited

U.S. PATENT DOCUMENTS

| | | | |
|---|---|---|---|
| 4,843,928 A * | 7/1989 | Wale | B23C 5/2265 82/131 |
| 5,542,793 A * | 8/1996 | Deiss | B23C 5/109 407/104 |
| 5,658,100 A | 8/1997 | Deiss | |
| 5,810,518 A * | 9/1998 | Wiman | B23B 27/065 407/102 |
| 5,882,150 A | 3/1999 | Furuta | |
| 5,924,826 A * | 7/1999 | Bystrom | B23B 27/1625 407/103 |
| 5,931,616 A * | 8/1999 | Daub | B23C 3/28 409/132 |
| 5,947,649 A * | 9/1999 | Arai | B23C 5/109 407/34 |
| 6,017,171 A | 1/2000 | Karlsson | |
| 6,196,770 B1 | 3/2001 | Astroem | |
| 6,247,878 B1 | 6/2001 | Musil | |
| 6,595,727 B2 * | 7/2003 | Arvidsson | B23C 5/006 407/35 |
| 6,811,359 B2 | 11/2004 | Craig | |
| 6,926,472 B2 * | 8/2005 | Arvidsson | B23B 27/12 407/110 |
| 6,960,049 B2 * | 11/2005 | Inayama | B23B 27/08 407/103 |
| 6,976,811 B1 | 12/2005 | DeRoche | |
| 7,040,844 B1 | 5/2006 | Daiguji | |
| 7,121,769 B2 | 10/2006 | Satran | |
| 7,204,662 B1 | 4/2007 | Long, II | |
| 7,241,082 B2 | 7/2007 | Smilovici | |
| 7,255,518 B2 | 8/2007 | Wallstrom | |
| 7,270,504 B2 * | 9/2007 | Tubinger | B23B 51/04 408/144 |
| 7,325,471 B2 * | 2/2008 | Massa | B23B 27/12 279/8 |
| 7,429,150 B2 | 9/2008 | Kovac | |
| 7,578,641 B2 * | 8/2009 | Andersson | B23C 5/2208 407/103 |
| 7,604,441 B2 | 10/2009 | Bhagath | |
| 7,922,427 B2 | 4/2011 | Spitzenberger | |
| 7,931,425 B2 | 4/2011 | Morrison | |
| 7,963,729 B2 | 6/2011 | Prichard | |
| 7,993,082 B2 * | 8/2011 | Horiike | B23C 5/109 407/113 |
| 8,177,460 B2 | 5/2012 | Satran | |
| 8,215,878 B2 | 7/2012 | Rozzi | |
| 8,439,609 B2 * | 5/2013 | Woodruff | B23C 5/109 407/11 |
| 8,454,284 B2 | 6/2013 | Waggle | |
| 8,621,964 B2 | 1/2014 | Filho | |
| 8,647,026 B2 | 2/2014 | Filho | |
| 2005/0169716 A1 | 8/2005 | Smilovici | |
| 2006/0260439 A1* | 11/2006 | Tubinger | B23B 51/04 76/108.6 |
| 2007/0248425 A1* | 10/2007 | Andersson | B23C 5/06 407/113 |
| 2007/0280790 A1* | 12/2007 | Kovac | B23B 27/1662 407/30 |
| 2008/0175676 A1* | 7/2008 | Prichard | B23C 5/2221 407/11 |
| 2008/0304928 A1* | 12/2008 | Engstrom | B23C 5/2247 408/229 |
| 2009/0103991 A1 | 4/2009 | Waggle | |
| 2009/0169313 A1* | 7/2009 | Satran | B23C 5/109 407/40 |
| 2010/0133761 A1 | 6/2010 | Waggle | |
| 2010/0239377 A1* | 9/2010 | Morrison | B23C 5/1045 407/11 |
| 2010/0272529 A1* | 10/2010 | Rozzi | B23C 5/207 408/56 |
| 2010/0329804 A1 | 12/2010 | Okumura | |
| 2011/0052337 A1* | 3/2011 | Dudzinsky | B23C 5/006 407/40 |
| 2011/0076106 A1* | 3/2011 | Morrison | B23C 5/1045 407/102 |
| 2011/0150586 A1* | 6/2011 | Fang | B23C 5/2208 407/69 |
| 2011/0217131 A1* | 9/2011 | Bonnarang | B23C 5/28 407/11 |
| 2011/0274506 A1* | 11/2011 | Kakai | B23C 5/109 407/40 |
| 2011/0293381 A1* | 12/2011 | Saji | B23C 5/109 407/40 |
| 2012/0251250 A1* | 10/2012 | Morrison | B23C 5/2221 407/42 |
| 2013/0129429 A1 | 5/2013 | Filho | |
| 2013/0129431 A1* | 5/2013 | Filho | B23C 5/109 407/40 |
| 2013/0142580 A1 | 6/2013 | Konta | |
| 2013/0236255 A1* | 9/2013 | Hecht | B23B 27/1622 407/103 |
| 2014/0086696 A1* | 3/2014 | Fang | B23C 5/2221 407/99 |
| 2014/0369773 A1* | 12/2014 | Waggle | B23C 5/003 407/54 |
| 2015/0336187 A1* | 11/2015 | Choi | B23C 5/06 407/48 |
| 2016/0031020 A1* | 2/2016 | Francis | B23C 5/109 407/42 |
| 2016/0158853 A1* | 6/2016 | Davis | B23C 5/109 407/34 |
| 2018/0036808 A1* | 2/2018 | Ballas | B23C 5/06 |

FOREIGN PATENT DOCUMENTS

| | | |
|---|---|---|
| CN | 102216011 A | 10/2011 |
| CN | 101304852 B | 3/2012 |
| DE | 69719361 | 1/2004 |
| GB | 2481312 A | 12/2011 |
| JP | 07251302 A * | 10/1995 |
| JP | 2008080437 A | 4/2008 |
| JP | 2010234457 | 10/2010 |
| JP | 2011206887 | 10/2011 |
| RU | 2383393 | 3/2010 |
| RU | 2412025 | 2/2011 |
| SU | 763090 | 9/1980 |
| SU | 1201072 | 12/1985 |
| WO | WO9826893 | 6/1998 |
| WO | WO9855254 | 12/1998 |
| WO | WO2008120186 | 10/2008 |
| WO | WO2009112931 | 9/2009 |
| WO | WO2010080385 | 7/2010 |
| WO | WO2010092807 | 8/2010 |
| WO | WO2010144180 | 12/2010 |
| WO | WO2011111035 A1 | 9/2011 |
| WO | WO2012047455 | 4/2012 |
| WO | WO2012070046 | 5/2012 |

OTHER PUBLICATIONS

Jan. 4, 2016 First Office Action.
Dec. 7, 2017 Second Office Action.
Dec. 1, 2016 Examination Report.
Jan. 13, 2016 First Office Action.
May 31, 2016 Examination Report.
Sep. 29, 2016 First Office Action.
Jan. 19, 2017 Third Office Action.
Aug. 30, 2016 Second Office Action.
Jul. 4, 2017 Fourth Office Action.
Feb. 28, 2019 International preliminary report on patentability received.
Mar. 22, 2019 EPO Notification R161(1) & R.162.

* cited by examiner

TOOL BODY FOR A SHELL END MILL AND CUTTING TOOL

FIELD OF THE INVENTION

The invention relates to a tool body for a shell end mill having at least one spiral or helical chip discharge flute arranged on the periphery of the tool body for discharging chips, and at least two receptacles, arranged on the chip discharge flute, for cutting inserts, wherein the receptacles respectively comprise a base surface with a hole for receiving a cutting insert mounting screw, and at least one first contact surface, which adjoins the base surface and is substantially orthogonal to the base surface.

The invention furthermore relates to a cutting tool, in particular a shell end mill, with a tool body of the type mentioned above.

BACKGROUND

Such tool bodies and cutting tools are known from the prior art. Shell end mills, which as a rule have a circular cylindrical basic shape, are used for machining tasks, in which a cutting process is to take place both on the end surface and on the shell surface of the shell end mill. For this purpose, the shell end mill comprises cutting edges, which are constituted for example by cutting inserts, both on the end surface and on its shell surface.

As a rule, a shell end mill of the type mentioned above, or more precisely its tool body, comprises several chip discharge flutes. On each chip discharge flute, a multitude of cutting inserts mounted on receptacles is arranged. Such a shell end mill thus comprises a multitude of cutting inserts and just as many associated receptacles. The designs of the respective tool body and of the cutting tool as a whole are therefore complex and accordingly expensive.

During the tool life, the price of a cutting tool is included in the machining costs. For this reason, machining a tool using a cutting tool of the type mentioned above, which comprises a tool body of the type mentioned above, is expensive.

SUMMARY OF THE INVENTION

The task of the invention is therefore to further improve cutting tools of the type mentioned above. In particular, the cost effectiveness of such tools in the machining of tools is to be improved.

The task is solved by a tool body of the type mentioned above, in which the transition between the base surface and the first contact surface is a flute. The base surface and the first contact surface thus do not form a physical edge. Rather, the flute at the transition between the two surfaces constitutes a recess, i.e. material has been removed in comparison to surfaces abutting against each other directly. The cross-section of the flute may be any shape, for example rectangular, circular or oval. By means of the flute, double-sided cutting inserts, which are characterized by comprising cutting edges on both sides, can be arranged in the receptacles. A quadrangular, double-sided cutting insert thus has eight cutting edges, a triangular cutting insert has six. The flute is arranged such that a cutting edge, which lies on the side of the double-sided cutting insert that is not used for the cutting at the time, can be received therein. The cutting edge is arranged on the inside of the flute and does not contact the end faces of the flute and thus not contact the tool body. A precise positioning of the double-sided cutting insert using the base surface and the first contact surface is thus still possible. By using double-sided cutting inserts instead of single-sided cutting inserts, the cost effectiveness of the cutting tool and the tool body in machining is increased.

In one embodiment, the tool body comprises between two and ten, preferably between five and seven chip guiding grooves. More chip guiding grooves are also possible. The number of chip guiding grooves can be determined considering the cutting task to perform and the size of the tool body.

In another embodiment, between three and thirty, preferably between five and twenty receptacles are arranged along each chip guiding groove of the tool body. It is also possible to have more receptacles depending on the length of the tool body and the cutting task to be performed.

Preferably, the flute lies at least partially behind the base surface and behind the first contact surface. The flute is thus set back with respect to the base surface, when viewed orthogonally to the base surface. The flute is also set back, when viewed orthogonally to the first contact surface. There is thus enough space for receiving a cutting edge of a double-sided cutting insert. The cutting edge also does not come into contact with the delimiting walls of the flute or the tool body during the mounting and aligning of the cutting insert and is therefore protected.

In one embodiment, the base surfaces enclose different angles with a longitudinal axis of the tool body. This angle, which is called an alignment angle or tool-sided machining angle, significantly affects the cutting result. In particular, all base surfaces that are provided on the end surface of the tool body for receiving cutting inserts for cutting may have a different alignment angle than the other base surfaces. Depending on the cutting task, the alignment angle may however also be defined individually for each base surface. The individual alignment angles as are calculated in the course of an optimization method, for which the finite element method can be used. Thus, the real entrance and exit angles of the indexable cutting inserts mounted on the respective recordings can be considered. In this way, a high quality cutting result can be achieved in a cost-effective manner.

One design variant provides that the receptacle comprises a second contact surface that adjoins the first contact surface and the base surface. A cutting insert mounted in the receptacle is thus secured on the base surface using a cutting insert mounting screw and positioned by abutting against the two contact surfaces. The interaction of the cutting insert mounting screw and the respective mounting hole in the cutting insert can be designed such that the cutting insert is pulled against the two contact surfaces during tightening of the cutting insert mounting screw. In this case, one contact surface may be arranged such that it supports a cutting insert mounted in the receptacle substantially in an axial direction of the tool body and the other contact surface is arranged to provide radial support. Thus, a precise and simple positioning of cutting inserts is possible and cutting inserts can be quickly exchanged and turned.

Advantageously, the transition between the first contact surface and the second contact surface is a flute. In the receptacle, cutting inserts with any corner radius can thus be arranged and abutted against the contact surfaces. Like the flute at the transition of the base surface to the first contact surface, the flute at the transition between the two contact surfaces may also extend at least in regions behind each of these surfaces. Because any contaminations, e.g. in the form of chips, can be accommodated in the flute when the cutting inserts are abutted against the contact surfaces, a precise positioning of the cutting inserts is always possible.

In one design alternative, each receptacle is associated with a coolant outlet opening arranged in the tool body for cooling a cutting insert received in the receptacle. In this way, higher cutting speeds and/or material removal rates can be achieved with consistently high cutting quality. Also with the cooling, the life span of indexable cutting insert, more specifically the cutting edge increases. The coolant outlet openings are designed such that they are directed toward a specific target region, e.g. toward the cutting edge, of a cutting insert mounted in the receptacle. Alternatively, each receptacle may also be associated with two or three coolant outlet openings.

Preferably, each coolant outlet opening communicates with a radial coolant channel, whereby all radial coolant channels are connected to a central coolant feed channel arranged axially in the tool body and the interfaces between the radial coolant channels and the central coolant feed channel are axially offset. At these interfaces, a coolant flow is transmitted from the central coolant feed channel to the respective radial coolant channels. The interfaces or connection points are spaced from one another in the axial direction of the tool body and thus also in the axial direction of the central coolant feed channel. Consequently, at each axial position of the central coolant feed channel, there is only one interface or connection point. This allows for accurate and efficient cooling of the cutting process. At the same time a tool body of high mechanical stability and strength is provided.

A variant provides that two coolant outlet openings are allocated to first two rows in each case as seen from the end face of the tool body from. The coolant outlet openings may be designed as twin openings, i.e. they are fed by a common coolant channel. The coolant may support the chip dissipation.

At least one coolant outlet opening for cooling a cutting process may also be arranged on the end surface of the tool body. These coolant outlet openings also serve to increase the cutting speed and/or the material removal rate. A multitude of coolant outlet openings may also be arranged on the end surface.

Preferably, the tool body comprises between two and ten, preferably between five and seven, chip discharge flutes with receptacles for cutting inserts and the chip discharge flutes are in particular distributed asymmetrically on the periphery of the tool body. In this way, a tool body results, which ensures a cost-effective performance of cutting tasks.

The tool body may be produced as one piece. In this case, a high mechanical stability of the tool body results. The tool body can be designed, for example, using the finite element method. In addition, such a tool body satisfies close tolerances, since mounting steps are dispensed with and no tolerance chain occurs. Precise and cost-effective cutting is thus possible.

In a preferred embodiment, between three and thirty, preferably between five and twenty, receptacles are arranged along the chip discharge flute. On each chip discharge flute, the same number of cutting inserts can thus be mounted. In this way, cost-effective cutting is ensured.

An alternative embodiment provides that on the base surface a projection for centering of an indexable cutting insert is arranged, wherein preferably the bore extends through the projection therethrough. With the help of the projection a indexable cutting insert mounted in the receptacle may be oriented along the base surface, e.g., centered. At the same time, a positive connection between the projection and the assembled indexable cutting insert results parallel to the base. If the bore extends through the projection therethrough, the bore may be designed deeper in comparison with a receptacle without projection. Then, e.g., a long thread may be arranged in the bore. The installation of the indexable cutting insert is facilitated and the fastening of the indexable cutting insert is improved.

The task is also solved by a cutting tool, in particular a shell end mill, with a tool body according to the present invention, wherein a double-sided cutting insert is mounted in each receptacle. Compared to a cutting tool with single-sided cutting inserts, twice the number of cutting edges is thus available. The tool life of the cutting tool is thus substantially doubled, which corresponds to a significant increase in cost effectiveness. The cutting inserts may have any shape, e.g. polyangular or round. The cutting inserts that are arranged on the end surface of a chip discharge flute can be arranged for end-surface machining. The other cutting inserts are as a rule arranged for peripheral machining.

Advantageously, a cutting edge on the mounting side is arranged in the flute at the transition between the base surface and the first contact surface.

The cutting inserts have a negative radial rake angle. The axial rake angle can be positive or negative, depending on the cutting task.

In one variant, the cutting insert comprises two base surfaces on the cutting insert side, which are set back toward the inside of the cutting insert compared to the associated cutting edges. In other words, the cutting edges protrude the base surface in a direction orthogonal to the base surface on the cutting insert side. A double-sided cutting insert comprises two base surfaces on the cutting insert side, one on each side. In the mounted condition, one of the base surfaces on the cutting insert side respectively abuts against the base surface on the tool body side. It is thus ensured that the cutting insert is precisely positioned in any position, i.e. in any rotary position or orientation.

BRIEF DESCRIPTION OF THE FIGURES

The invention will be explained below with reference to various exemplary embodiments that are shown in the accompanying drawings. The figures show.

DETAILED DESCRIPTION

Embodiments described herein can be understood more readily by reference to the previous and following detailed description and examples and the associated figures. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

A shell end mill 10 comprises a tool body 12, which has substantially a circular cylindrical shape with a tool body longitudinal axis 14.

The tool body 12 comprises a clamping end 16 with which it can be clamped in a machine tool, not shown, and an opposite, machining end 18. On the machining end 18, an end face 20 is arranged.

The shell end mill 10 is designed for machining on its end face 20 and at its circumference 22. The circumference 22 may also be referred to as a lateral surface.

In the illustrated embodiment the tool body 12 is designed integrally/monolithic.

In the tool body 12 chip guiding grooves 24 are arranged. These extend spirally or helically around the circumference 22 of the tool body 12 and assist chip evacuation and/or the direction of chip flow.

In the illustrated embodiments, the tool body 12 comprises five, six or seven chip guiding grooves 24. Depending on the diameter of the tool body and the size of the used indexable cutting inserts 26, the tool body may also comprise more or fewer chip guiding grooves 24.

Figure 1:
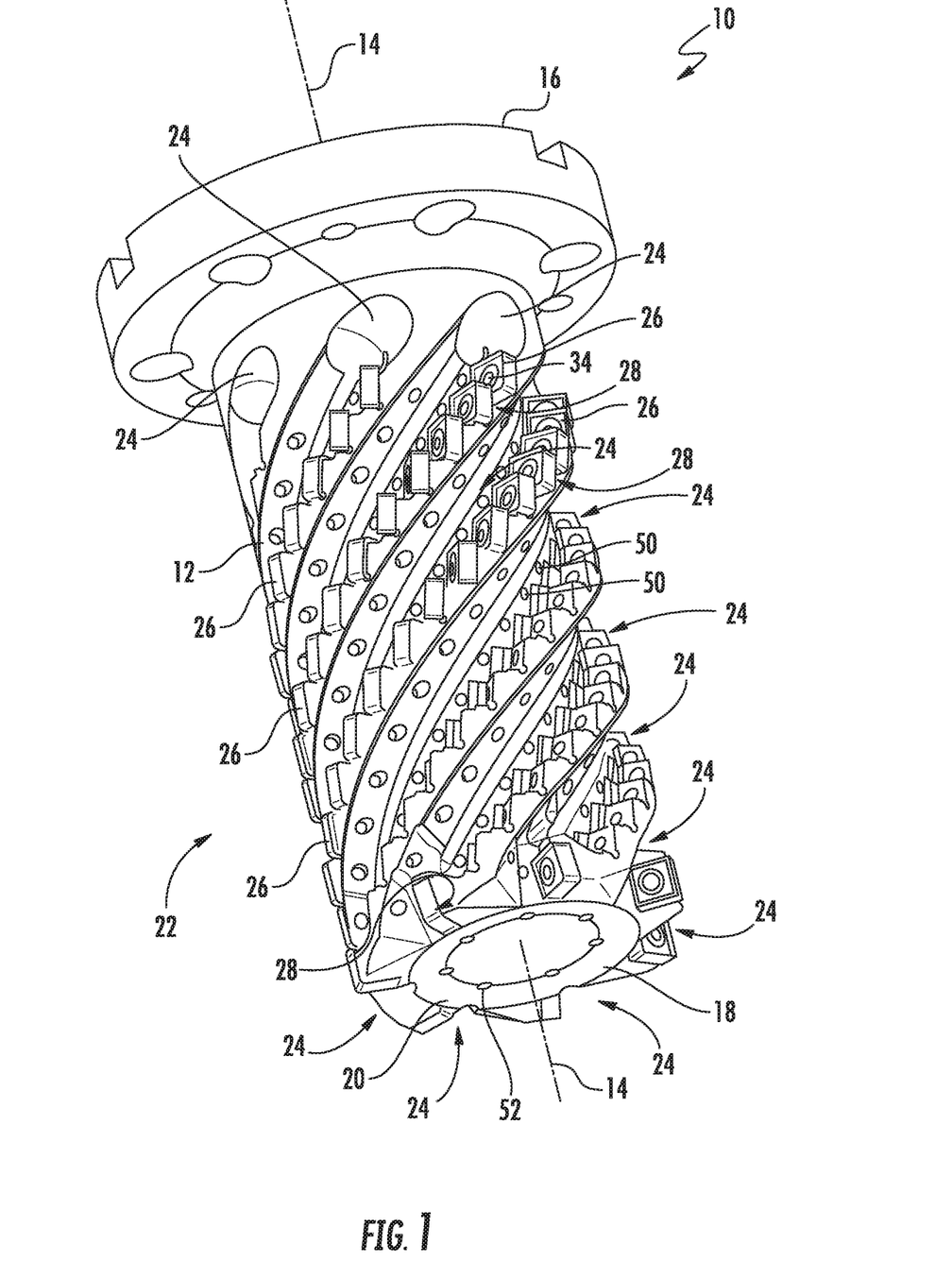
FIG. 1 illustrates a cutting tool according to the present invention with a tool body according to the present invention in accordance with a first embodiment with seven chip discharge flutes in a perspective view.
Figure 2:
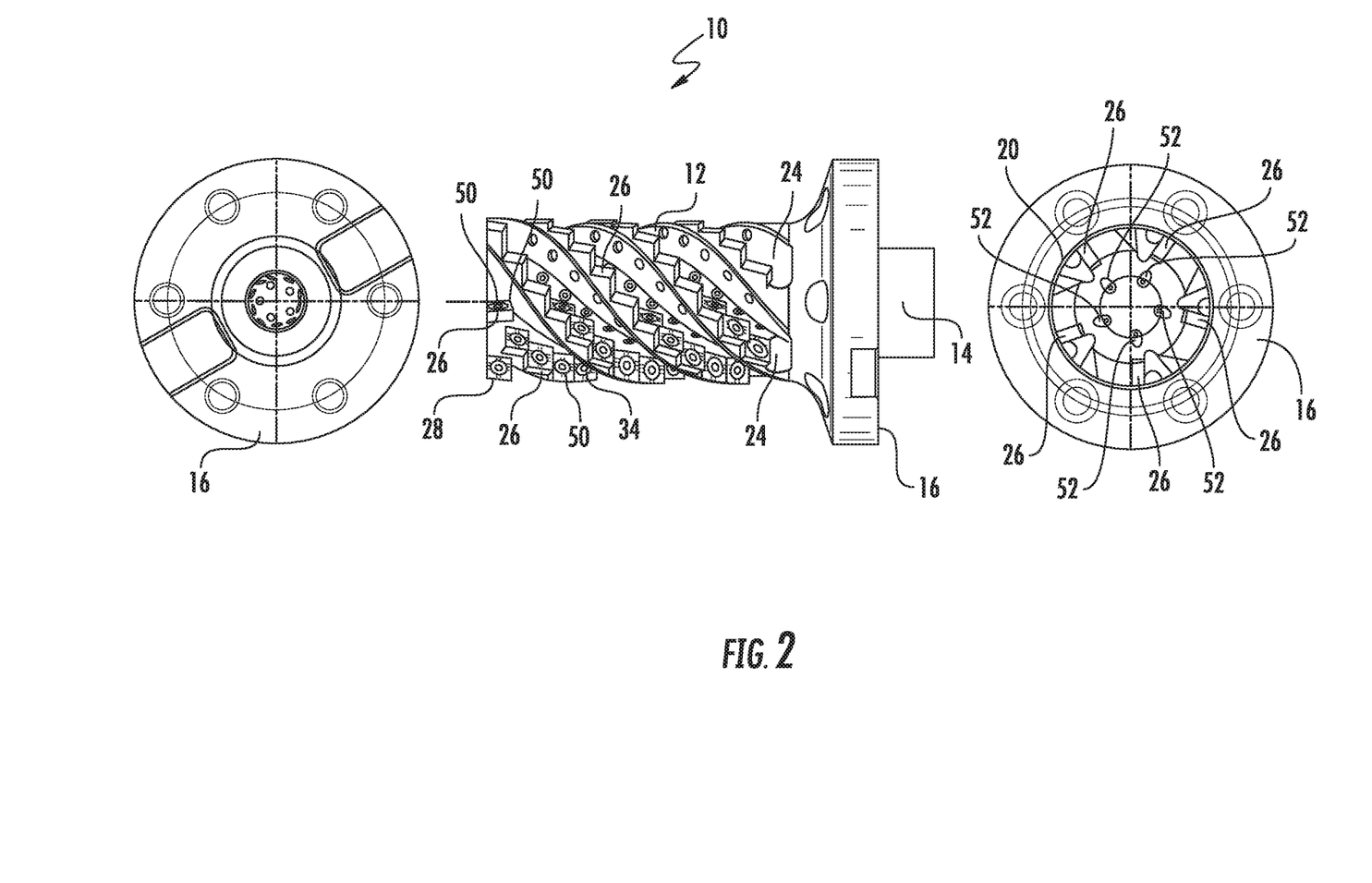
FIG. 2 illustrates a cutting tool according to the present invention with a tool body according to the present invention in accordance with a second embodiment with five chip discharge flutes in a three-view drawing.
Figure 3:
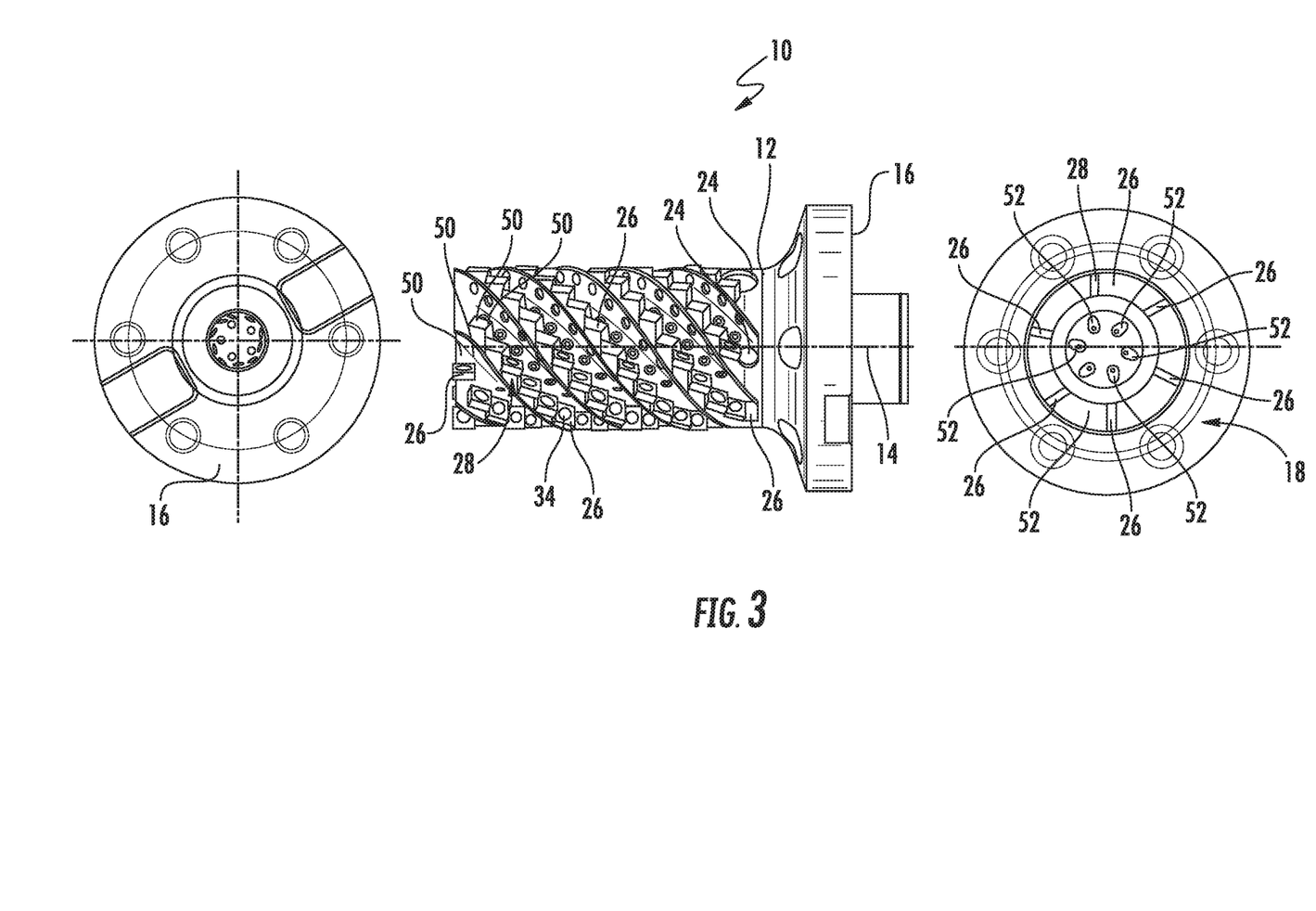
FIG. 3 illustrates a cutting tool according to the present invention with a tool body according to the present invention in accordance with a third embodiment with six chip discharge flutes in a three-view drawing.

With particular reference to FIG. 2 and FIG. 3, the chip guiding grooves 24 are unevenly distributed around the circumference 22 of the tool body 12. This means that the angular spacings between adjacent chip guiding grooves 24 are different in terms of distance.

At the chip guiding grooves 24 indexable cutting inserts 26 are arranged.

Figure 6:
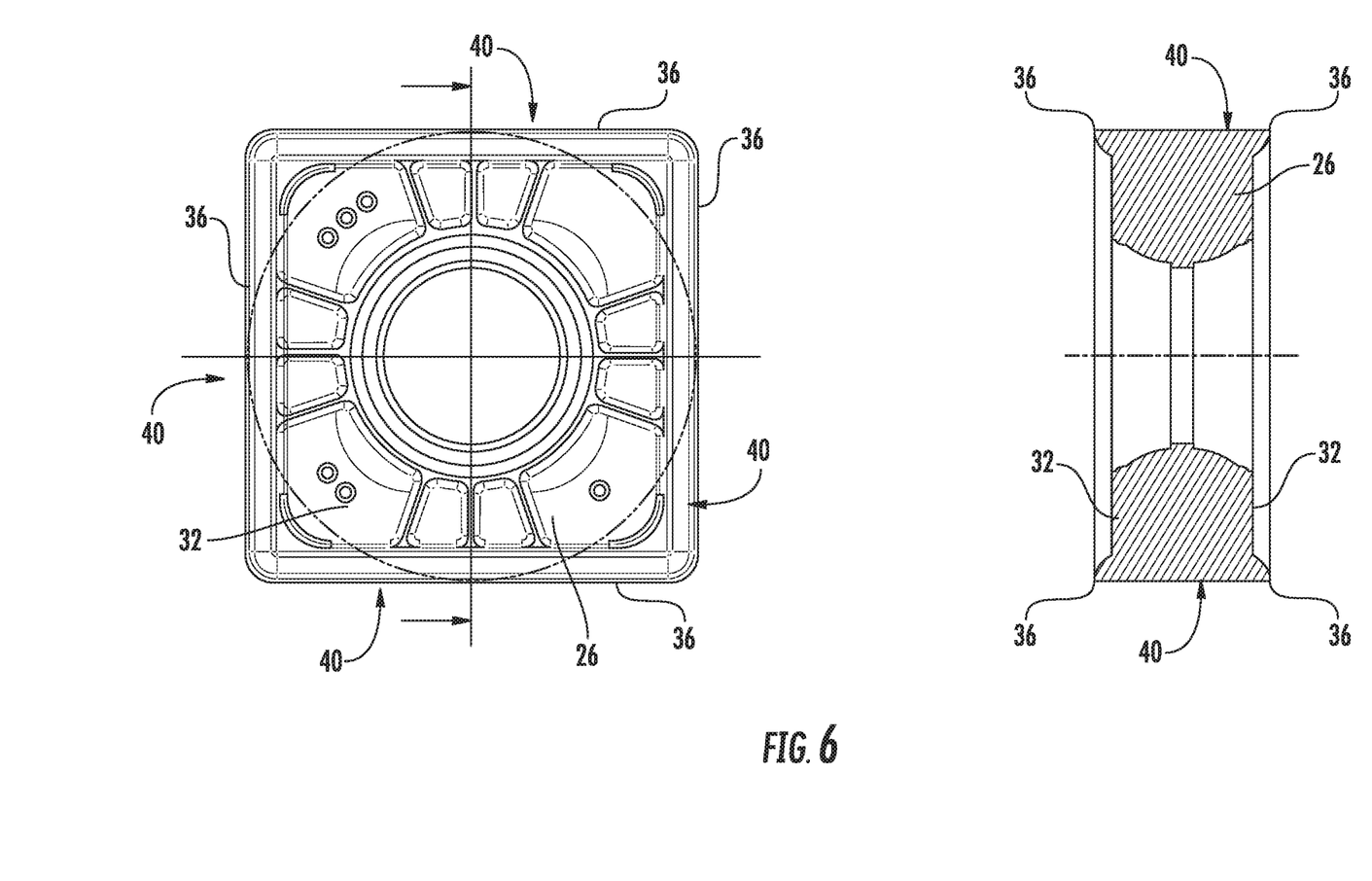
FIG. 6 is an indexable cutting insert of an inventive cutting tool in plan view and sectional view.

The indexable cutting inserts 26 are each set in a receptacle 28 and designed bilaterally. Such indexable cutting insert 26 is shown in FIG. 6. However, there may be other, indexable cutting inserts, not shown in the demonstrated shell end mill 10.

The receptacles 28 each comprise a base surface 30. A corresponding base surface 32 of an indexable cutting insert 26 is located adjacent to this base surface 30. Then, the indexable cutting insert 26 is attached to the receptacle 28 with an indexable cutting insert fixing screw 34, which engages in a hole 35 of the base surface 30.

Since these are two-sided indexable cutting inserts 26 in the illustrated embodiment, each indexable cutting insert 26 comprises two cutting insert base surfaces 32. As can be seen particularly in FIG. 6, the cutting insert base surfaces 32 are set back relative to cutting edges 36, which are arranged on the same side.

The indexable cutting inserts 26 have a negative rake angle in the illustrated embodiment.

The inclination of the inserts 26 may be adjusted to the tool's longitudinal axis 14 via the inclination of the base surface 30 to the tool body axis 14. The angle between the base surface 30 and the longitudinal axis of the tool body 14 may be individually selected depending upon the cutting application for each base surface.

In the illustrated embodiment, the angles of each corresponding base surfaces 30 are equal, which are arranged in adjacent chip guiding grooves 24. This means, e.g., that all third base surfaces 30 and therefore all third indexable cutting inserts 26 have the same angle along the chip guiding grooves 24 with respect to the tool body longitudinal axis 14. However, the angle of the individual base areas 30 differ within a chip guiding groove 24.

Further, the receptacle 28 includes a first abutment surface 37 and a second abutment surface 38.

When assembled, the indexable cutting insert 26 is available with one of its side surface 40 is located adjacent to the abutment surface 37 and the abutment surface 38, respectively.

Both the first abutment surface 37 and the second abutment surface 38 are adjacent to the base surface 30.

Figure 5:
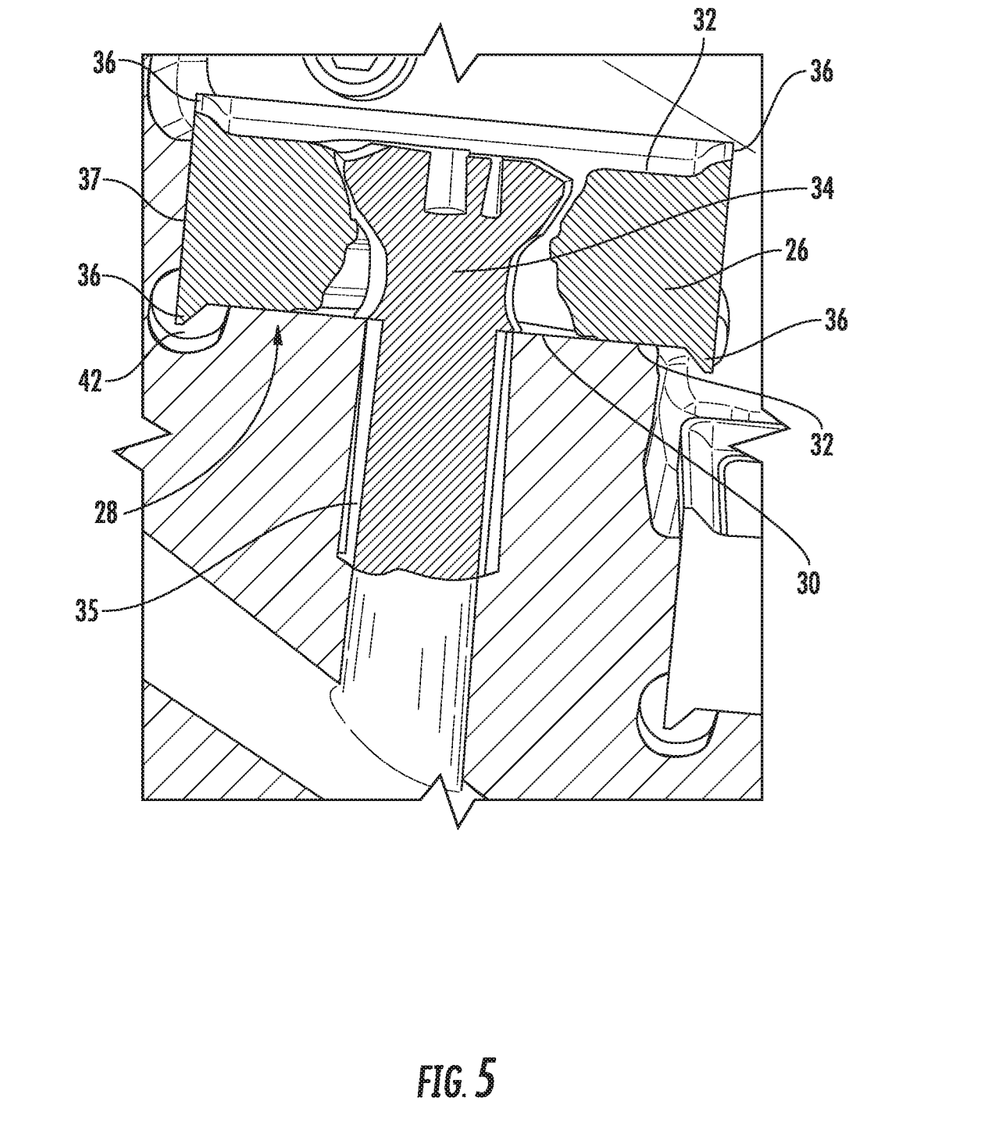
FIG. 5 is a sectional view of an indexable cutting insert fastened in a receptacle of an inventive tool body.

As seen in FIG. 5, the first abutment surface 37 is substantially perpendicular to the abutment surface 30. Similarly, the second abutment surface 38 is substantially perpendicular to the base surface 30.

Since rectangular or square indexable cutting inserts 26 are used in the illustrated embodiment, the first abutment surface 37 and second abutment surface 38 are substantially perpendicular to each other.

The transition between the base surface 30 and the first abutment surface 37 is designed as a groove 42.

This groove 42 is designed so that it is located behind the base surface 30, when viewed in a direction perpendicular to the base surface 30 and is located behind the first abutment surface 37, when viewed in a direction perpendicular to the abutment surface 37.

Figure 4:
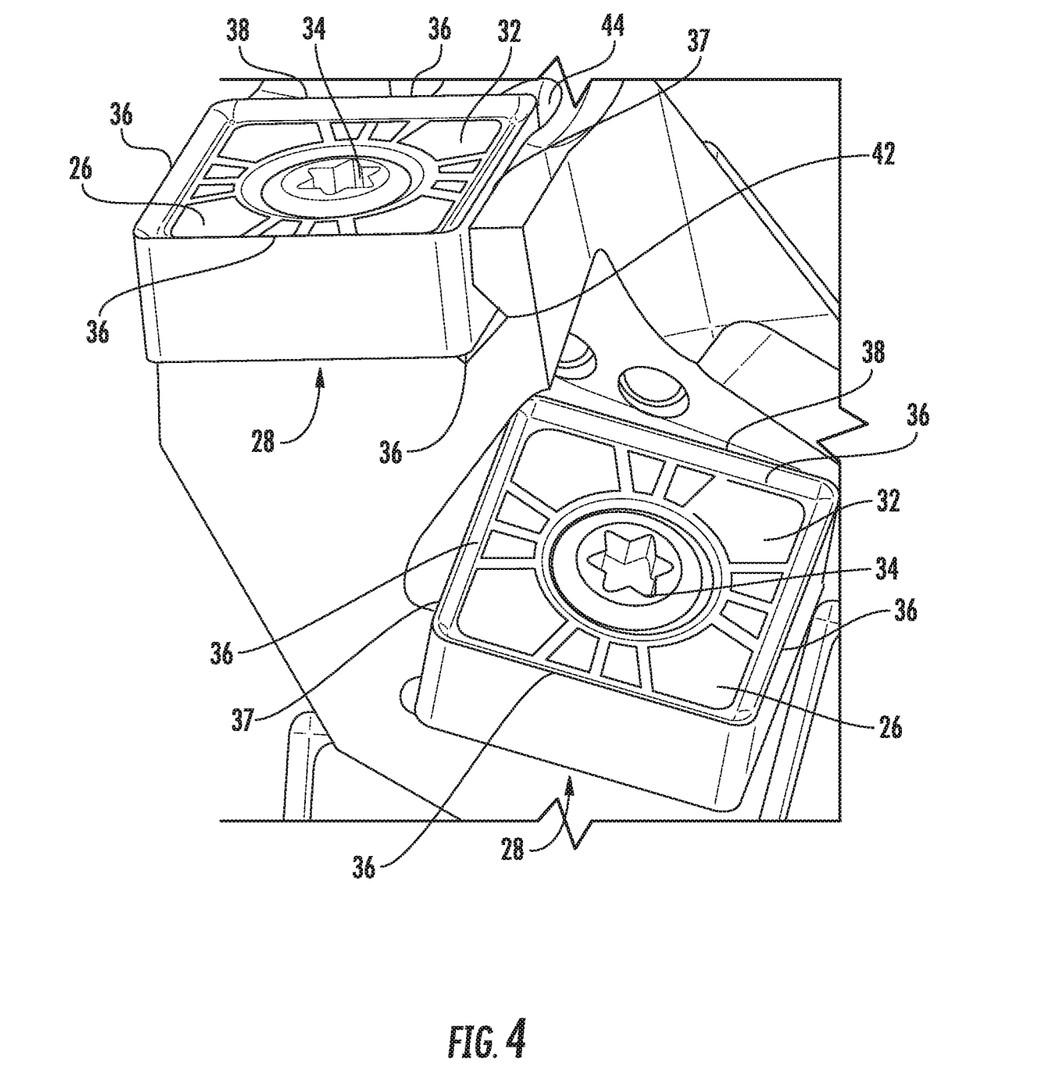
FIG. 4 illustrates a detailed view of two cutting inserts of a cutting tool according to the present invention, which are respectively mounted in a receptacle of a tool body according to the present invention.

As seen in FIG. 4, the groove 42 may have a rectangular cross section.

In the receptacle 28 shown in FIG. 5, the groove 42 has a circular cross section.

A comparable groove 30 of the base surface not shown is provided at the transition to the second abutment surface 38.

As shown in FIG. 4, the transition between the first abutment surface 37 and the second abutment surface 38 is also designed as a groove 44.

In the illustrated embodiment, the groove 44 has a circular cross-section, however, it may have any desired cross section as groove 42.

If the indexable cutting inserts 26 are mounted in the seats 28, a differentiation must be made between a clamping side of the indexable cutting insert 26 and a cutting side of the indexable cutting insert 26. The clamping side of the indexable cutting insert 26 is oriented towards the base surface 30. The cutting edges 36 on this side are not involved in the machining. The cutting side is opposite to the clamping side. One of disposed cutting edges 36 on the machining side takes part in the machining.

In the assembled state of the indexable cutting insert 26, at least one cutting edge 36 is arranged in the groove 42 on the clamping-sided side of the indexable cutting insert 26. This can be seen in FIG. 4 and FIG. 5.

Figure 7:
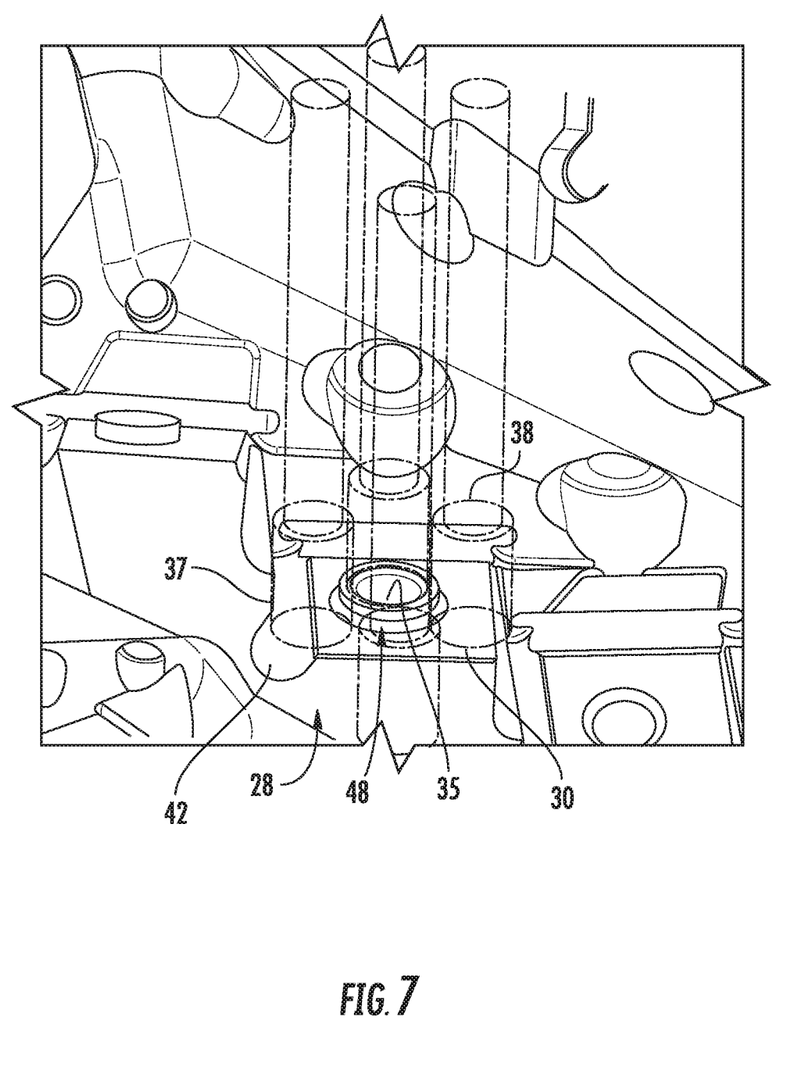
FIG. 7 is a detailed view of an alternative embodiment of a receptacle for an inventive tool body and FIG. 8 is a schematic perspective view of the coolant channels of the inventive tool body, wherein the tool body is transparent.

In an alternative embodiment of the receptacle 28, shown in FIG. 7, a projection 48 is arranged on the base surface 30. On this projection 48 the indexable cutting insert 26 may be centered during assembly. For this purpose, it must have a bore 35 associated with the geometry of the projection 48. The centering projection 48 may be located, sized, and/or shaped to provide "easy" centering such that the indexable insert 26 may not be seated without proper contact between the abutment surfaces 37, 38, the indexable cutting insert 26, and the projection 48. Thus, a limited number of rotational, radial, lateral, and axial positions are permitted with a projection 48 as illustrated in FIG. 7.

In the illustrated embodiment, the projection 48 has the shape of a circular cylinder and the bore 35 is arranged centrally in the projection 48.

During assembly of the indexable cutting insert 26, it is first prepositioned on the projection 48 and then arranged to the abutment surfaces 37, 38 in the course of screwing in the indexable cutting insert attachment screw 34.

In the illustrated embodiment, thirteen or seventeen indexable cutting inserts 26 are positioned on each chip guiding groove 24. For clarity, only individual indexable cutting inserts 26 are provided with a reference number. The number of indexable cutting inserts 26 at each chip guiding groove may be determined, among other factors, depending on the length of the tool body and the size of the indexable cutting inserts 26 to be used.

The shell end mill 10 may be operated with the use of coolants or refrigerants. Unspecified coolant channels are provided in the tool body 12.

In the illustrated embodiment, each receptacle 28 and therefore each indexable cutting insert 26 is associated with a coolant outlet opening 50 being the end of a radial coolant channel 54, which is fed via by a central coolant feed channel 56. Thus, the receptacle and indexable cutting insert received therein may be cooled during the machining process. For clarity, only selected coolant outlet openings 50 are provided with a reference mark.

Each two coolant outlet openings 50 may be associated to those receptacles 28, which are located in the first and second row viewed from the end face 20. Then, the coolant flow additionally supports the chip evacuation. This can be seen in FIG. 3. Likewise, the cooling channels fed via coolant outlet openings 52 are arranged on the end face 20 of the tool body 12.

Figure 8:
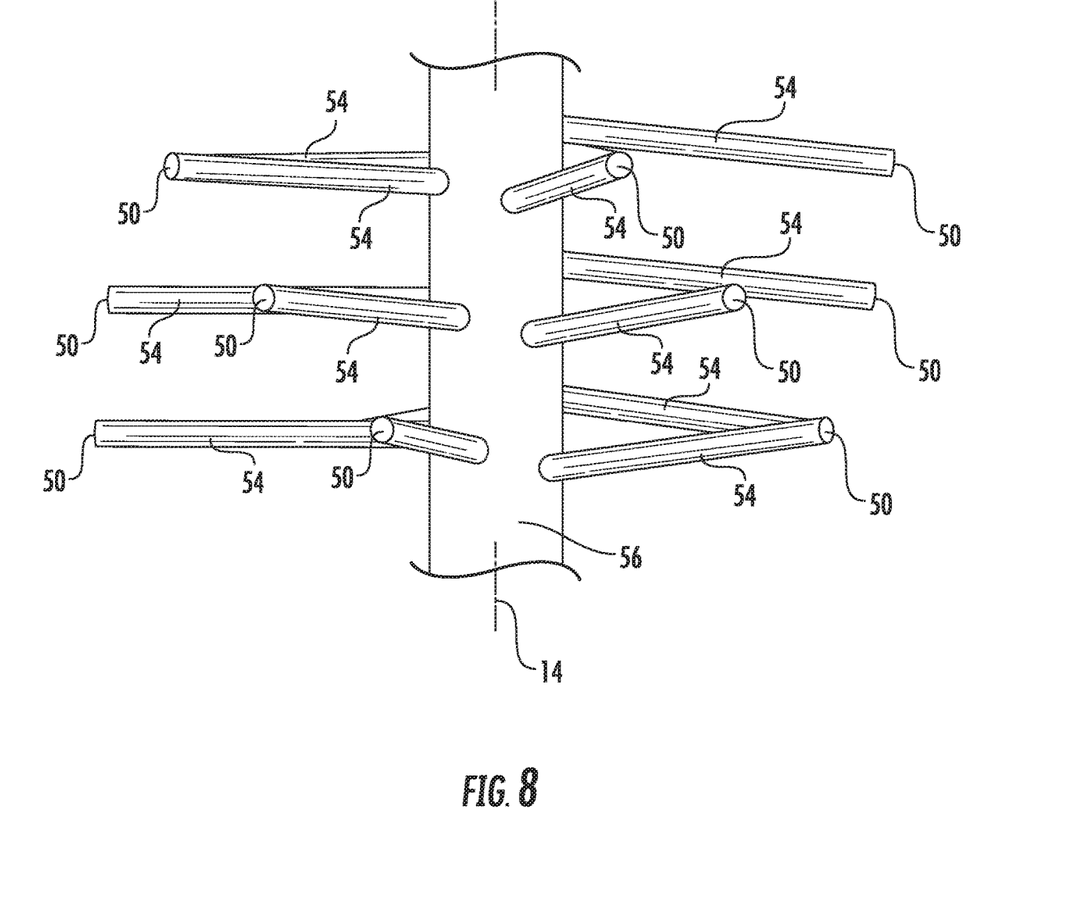

In FIG. 8 the radial coolant channels 54 and the central coolant feed channel 56 can be seen. The tool body 12 is not illustrated in this figure.

The radial coolant channels 54 connect the coolant outlet openings 50 to the central coolant feed channel 56. The interfaces of the radial coolant channels 54 and the central coolant feed channel 56 are spaced from each other, when seen in an axial direction, which corresponds to the longitudinal axis 14 in the present embodiment. Therefore, the tool body 12 has a maximum mechanical stability.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A tool body for a shell end mill, the tool body comprising:
   at least one helical chip-guiding groove arranged on a circumference of the tool body for chip dissipation; and
   at least two receptacles arranged at the at least one chip-guiding groove,
   wherein each receptacle comprises a base surface comprising a bore for receiving an indexable cutting insert fastening screw and at least one first abutment surface located adjacent to the base surface, the first abutment surface being substantially perpendicular to the base surface; and
   wherein a groove is formed at a transition between the base surface and the first abutment surface; and
   wherein each receptacle has a coolant outlet opening for cooling an indexable cutting insert in the receptacle arranged in the tool body and each coolant outlet opening communicates with a radial coolant channel, whereby all radial coolant channels are connected to a central coolant feed channel arranged axially in the tool body and the interfaces between the radial coolant channels and the central coolant feed channel are axially offset relative to one another such that, at each axial position of the central coolant feed channel, there is only one interface between the radial coolant channels and the central coolant feed channel.

2. The tool body of claim 1, wherein the groove is located at least partially behind the base surface when viewed in a direction perpendicular to the base surface and behind the first abutment surface when viewed in a direction perpendicular to the first abutment surface.

3. The tool body of claim 1, wherein the base surface of one receptacle for the at least one helical chip-guiding groove has a first angle with respect to a longitudinal axis of the tool body, and wherein the base surface of a different receptacle for the at least one helical chip-guiding groove has a second, different angle with respect to the longitudinal axis of the tool body.

4. The tool body of claim 1, wherein the receptacle comprises a second abutment surface that is adjacent to the first abutment surface and the base surface.

5. The tool body of claim 4, wherein a groove is formed at a transition between the first abutment surface and the second abutment surface.

6. The tool body of claim 1, wherein at least one of the coolant outlet openings is arranged for cooling of a machining process on the end face of the tool body.

7. The tool body of claim 1, further comprising a plurality of chip-guiding grooves, and wherein the plurality of chip-guiding grooves are unevenly distributed on the circumference of the tool body such that angular spacings between adjacent chip guiding grooves are different in terms of distance.

8. The tool body of claim 1, wherein the tool body is integrally-formed as a monolithic body.

9. The tool body of claim 1:
   wherein a projection is arranged on the base surface, the projection being arranged for centering an indexable insert on the base surface; and
   wherein the bore extends through the projection.

10. A cutting tool comprising a tool body according to claim 1,
    wherein the cutting tool is a shell end mill; and
    wherein a two-sided indexable insert is attached to each receptacle.

11. The cutting tool of claim 10, wherein the two-sided, indexable cutting insert defines a clamping side proximate the base surface of the receptacle and a cutting side distal the base surface of the receptacle when the two-sided, indexable cutting insert is mounted in the receptacle, and wherein at least one cutting edge of the clamping side of the two-sided, indexable cutting insert is arranged in the groove at the transition between the base surface and the first abutment surface.

12. The cutting tool of claim 10, wherein the two-sided, indexable cutting insert has a negative radial rake angle when mounted on the cutting tool.

13. The cutting tool of claim 10, wherein the two-sided, indexable cutting insert comprises two base surfaces set back relative to associated cutting edges.

14. A tool body for a shell end mill, the tool body comprising:
- at least one helical chip-guiding groove arranged on a circumference of the tool body for chip dissipation; and
- at least two receptacles arranged at the at least one chip-guiding groove,
- wherein each receptacle comprises a base surface comprising a bore for receiving an indexable cutting insert fastening screw and at least one first abutment surface located adjacent to the base surface, the first abutment surface being substantially perpendicular to the base surface; and
- wherein a groove is formed at a transition between the base surface and the first abutment surface;
- wherein a two-sided, indexable insert is attached to each receptacle; and
- wherein the base surface of one receptacle for the at least one helical chip-guiding groove has a first angle with respect to a longitudinal axis of the tool body, and wherein the base surface of a different receptacle for the at least one helical chip-guiding groove has a second, different angle with respect to the longitudinal axis of the tool body.

* * * * *